United States Patent [19]
Farnung

[11] 3,818,856
[45] June 25, 1974

[54] REFLECTOR ELEMENT MOUNTING STRUCTURE FOR BICYCLE PEDALS

[75] Inventor: Hermann Farnung, Fulda, Germany

[73] Assignee: Wagner & Co. Fahrzeugteilefabrik, Fulda, Germany

[22] Filed: June 9, 1972

[21] Appl. No.: 261,472

[30] Foreign Application Priority Data
Nov. 17, 1971  Germany............................ 2157027

[52] U.S. Cl................................. 116/28 R, 350/99
[51] Int. Cl...................................................... B60q
[58] Field of Search............ 116/28 R, 35; 74/594.1, 74/594.2, 594.6; 350/97, 98, 99, 100

[56] References Cited
UNITED STATES PATENTS

| | | | |
|---|---|---|---|
| 2,151,144 | 3/1939 | Penny et al. | 350/99 |
| 2,478,735 | 8/1949 | Anderson | 350/99 |

FOREIGN PATENTS OR APPLICATIONS

| | | | |
|---|---|---|---|
| 154,162 | 9/1938 | Austria | 350/99 |
| 778,885 | 7/1957 | Great Britain | 350/99 |
| 1,055,984 | 10/1953 | France | 350/99 |
| 946,417 | 8/1956 | Germany | 116/28 |
| 668,458 | 12/1938 | Germany | 350/99 |

Primary Examiner—Louis J. Capozi
Attorney, Agent, or Firm—Markva & Smith

[57] ABSTRACT

A reflector element mounting structure for bicycle pedals comprises a pedal tread plate having a cutout opening and a reflector element disposed therein. The reflector element has a shoulder located at each end thereof with each of the shoulders being abutted against the inner side of the tread plate whereby a reflecting surface of the reflector element is exposed through said cutout opening. A holding means is used for biasing the reflector element so that the abutting shoulders of the reflector element are secured against the said inner side of the tread plate. In a specific embodiment, the holding means includes a U-shaped member that extends around the reflector element through the cutout opening on opposing sides of the reflector element and grips the outer side of the tread plate along the periphery of the cutout opening.

9 Claims, 5 Drawing Figures

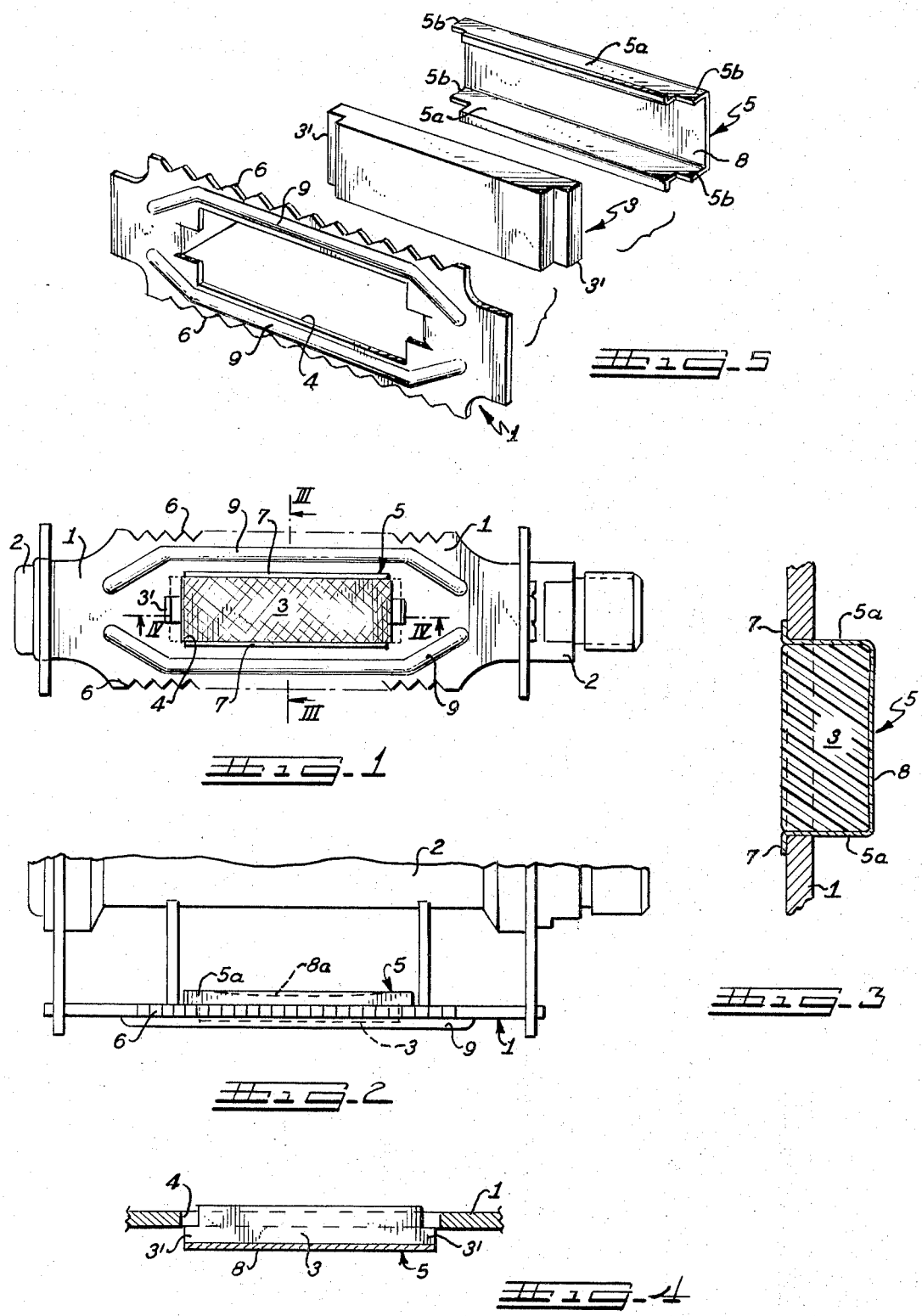

3,818,856

REFLECTOR ELEMENT MOUNTING STRUCTURE FOR BICYCLE PEDALS

BACKGROUND OF THE INVENTION

This invention relates to a reflector element mounting structure for bicycle pedals. Such a reflector element is commonly referred to as a rear reflector although it will reflect light from other directions.

With bicycles pedals, the problem of mounting the reflector element has so far been solved by screwing or otherwise securing an additional mounting element such as a metal housing or the like to the outside of the pedal tread plate. Apart from the reflector element, the manufacture of the metal housing was complicated because it required bolts, nuts and possibly even elastic elements such as foam plastics, laminated springs or similar devices. Furthermore, a considerable amount of labour was involved in the assembly. This prior art arrangement has the disadvantage that the reflector can readily become worn, that is, the reflector is recessed behind the outer surface of the reflector housing by an amount equal to the thickness of the housing material (about 0.2 mm) and is therefore particularly subject to soiling or damage by the heel of the shoe.

Mounting elements constructed of rubber or plastics housings are also known. Such mounting elements serve to hold the rear reflector and are provided with barbed surfaces which engage stamped slots in the tread plate. This arrangement has the disadvantage that reflectors mounted in this way are readily detached from the tread plate. In a known form of construction the mounting even recedes behind the outer surface of the reflector so that the latter is highly susceptible to damage.

With a view to avoiding these disadvantages, a further proposal has already been made which is characterized in that the reflector is mounted within an appropriate cutout in the tread plate by caulking the tread plate against the side faces of the reflector. Further, ridges are provided between the longitudinal edges of the reflector and the rows of teeth or the smooth longitudinal edges of the tread plate.

The ridges are preferably formed so as to face outward in order to cause the outer surface of the reflector to be protected from damage.

The latter proposed solution of the problem concerned has considerable advantages. However, difficulty arose owing to tolerance fluctuations or brittleness of the reflector.

SUMMARY OF THE INVENTION

It is the object of the present invention to eliminate the above disadvantages and to provide a reflector element mounting structure for bicycle pedals which is simple in construction and which will effectively and efficiently perform the purposes for which it is intended.

To attain this object, the present invention provides a reflector mounting structure for bicycle pedals which comprises a reflector element having a shoulder at its end faces and a U-shaped member that extends around the reflector element through the cutout opening on opposing sides of the reflector element and grips the outer side of the tread plate along the periphery of the cutout opening. In a specific embodiment, the U-shaped member is an open ended channel member including a web and oppositely disposed legs likewise forming a shoulder at their ends. The legs have a width which exceeds the thickness of the reflector element so as to provide free longitudinal edges. The channel member and said reflector element are secured within a cutout in a tread plate of a bicycle pedal by all the shoulders abutting the inner surface of the tread plate and the free longitudinal edges of the channel member being bent over against the outer surface of the tread plate.

BRIEF DESCRIPTION OF THE DRAWING

An embodiment of the invention will now be described by way of example and with reference to the accompanying drawings, in which:

FIG. 1 is an elevational view of a bicycle pedal having a rear reflector mounting structure according to the invention;

FIG. 2 is a fragmentary top plan view of FIG. 1; and

FIG. 3 is a cross section through the tread plate of the pedal on the line III—III of FIG. 1;

FIG. 4 is a cross-section through the tread plate of the pedal on the line IV—IV of FIG. 1; and FIG. 5 is an exploded view of the bicycle pedal shown in FIG. 1.

DESCRIPTION OF THE PREFERRED EMBODIMENT

FIGS. 1 and 2 show a reflector element 3 mounted in the tread plate 1 of a bicycle pedal 2 in such a way that, with normal use, falling out of the rear reflector is prevented and optimum protection from mechanical damage of its outer surface is attained.

The reflector element 3 forms a shoulder 3' at each end thereof and is inserted from the inside of the pedal into a rectangular cutout 4 in the tread plate 1, the size of said cutout 4 corresponding to that of the reflector 3.

An open ended channel member 5 of generally U-shaped cross section and preferably made of sheet metal mounts the reflector element 3 between its oppositely disposed legs 5a connected by a web 8. The legs 5a likewise form a shoulder 5b at their ends which corresponds to the shoulders 3' at the ends of the reflector element 3.

As shown in FIG. 3, the legs 5a of the channel member 5 have a length which exceeds the thickness of the reflector element 3 to form free longitudinal leg edges 7 projecting to a certain extent outward beyond the outer surface of the tread plate 1. The edges 7 are then bent over in the direction towards the outer surface of the tread plate, i.e. against the rows of teeth 6, whereby the shoulders 3' and 5b of the reflector element 3 and of the channel member 5, respectively, are caused intimately to abut the inner surface of the tread plate 1 thus securing the reflector element 3 firmly within its cutout 4 in the tread plate 1. See FIGS. 2 and 4.

The web 8 of the channel member 5 is preferably slightly depressed in the manner of a tray in the direction towards a reflector element which is to be inserted (See the dotted line 8a showing a depressed configuration.); a certain resilience during assembly of the reflector element in the tread plate, said resilience also compensating tolerances in the material.

Outwardly directed ridges protuberances 9 are pressed into the tread plate 1 between the rows of teeth 6 and the longitudinal edges of the oppositely disposed legs of the channel member 5. Protuberances 9 impart increased stability to the tread plate 1 and constitute a protection for the outer surface of the reflector element 3.

The invention may be embodied in other specific forms without departing from the spirit or essential characteristics thereof. The embodiment is therefore to be considered in all respects as illustrative and not restrictive.

What is claimed is:

1. A reflector mounting structure for bicycle pedals comprising:
    a. a pedal tread plate having an inner and outer side and a shaped cutout opening therein,
    b. a reflector element having means forming a shoulder located at each end thereof,
    c. said reflector element being disposed within said cutout opening with said shoulders being abutted against the inner side of the tread plate whereby a reflecting surface of the reflector element is exposed through said cutout opening, and
    d. holding means adjacent the reflector element and including means for biasing the reflector element so that the abutting shoulders of the reflector element are held against said inner side of the tread plate.

2. A reflector mounting structure as defined in claim 1 wherein
    said holding means comprises a U-shaped member that extends around the reflector element through the cutout opening on opposing sides of the reflector element and includes means for gripping the outer side of the tread plate along the periphery of the cutout opening.

3. A reflector mounting structure as defined in claim 1 wherein
    said holding means comprises a channel member having a web and oppositely disposed legs having a width which exceeds the thickness of the reflector element to extend through the cutout opening,
    said legs having a bent over portion disposed against the outer side of the tread plate along the periphery of the cutout opening.

4. A reflector mounting structure as defined in claim 3 wherein
    the channel member has a portion that is longer than the length of the cutout opening and includes means forming shoulders at the ends of each of the legs which shoulders abut the inner side of the tread plate.

5. A reflector mounting structure as defined in claim 4 wherein
    the channel member is open ended and has a generally U-shaped cross section.

6. A reflector mounting structure as defined in claim 3 wherein
    the reflector element and the channel member are substantially the same length.

7. A reflector mounting structure as defined in claim 3 wherein
    the channel member is composed of U-shaped sections arranged side by side.

8. A reflector mounting structure as defined in claim 3 wherein
    the channel member includes a web and
    the web of the channel member includes a depressed configuration so that it is resilient.

9. A reflector mounting structure as defined in claim 3 wherein
    said tread plate includes outwardly directed ridges located on the outer side of said plate for protecting the outer surface of the reflector element.

* * * * *